United States Patent [19]

Peinetti et al.

[11] 4,308,991
[45] Jan. 5, 1982

[54] PROGRAMMABLE ELECTRONIC THERMOSTAT

[75] Inventors: Donald L. Peinetti, San Diego, Calif.; Dennis M. Rippelmeyer, Waterloo, Ill.

[73] Assignee: Emerson Electric Co., St. Louis, Mo.

[21] Appl. No.: 166,748

[22] Filed: Jul. 7, 1980

[51] Int. Cl.³ .................. F23N 5/20; G05D 23/00
[52] U.S. Cl. .................................. 236/46 R; 165/12; 236/94
[58] Field of Search .............. 236/46 R, 47, 51, 94; 165/12, 11; 364/104; 340/309.4

[56] References Cited

U.S. PATENT DOCUMENTS

| | | | |
|---|---|---|---|
| 4,071,745 | 1/1978 | Hall | 165/22 |
| 4,174,807 | 11/1979 | Smith et al. | 236/47 |
| 4,189,776 | 2/1979 | Kendall | 364/420 |
| 4,191,328 | 3/1980 | Isaacs et al. | 236/46 R |
| 4,206,872 | 6/1980 | Levine | 236/46 R |
| 4,217,646 | 8/1980 | Caltagirone et al. | 237/2 A |
| 4,235,368 | 11/1980 | Neel | 200/302 X |

Primary Examiner—William E. Wayner
Attorney, Agent, or Firm—Paul A. Becker, Sr.

[57] ABSTRACT

A space thermostat for controlling temperature at different levels during different time periods includes a programmable microprocessor which has been pre-programmed to provide a plurality of chronologically annunciated displays. Each display contains a time and temperature within a specific time range. A multi-segment keyboard is provided to enable the homeowner to set the correct clock time and day of the week, to recall each display, and to change, if necessary, the time and temperature of each display so as to establish a desired seven-day time-temperature schedule.

2 Claims, 8 Drawing Figures

PROGRAMMABLE ELECTRONIC THERMOSTAT

BACKGROUND OF THE INVENTION

This invention relates to space thermostats, and particularly to programmable electronic space thermostats for controlling operation of a heating and/or cooling system according to a programmed time-temperature schedule.

Due to the recent emphasis on energy conservation, the replacement of existing conventional thermostats by thermostats having the capability of automatically controlling the temperature of a space of two or more different levels of temperature is becoming more popular. Accordingly, there are available on the market a wide variety of such replacement thermostats, sometimes referred to as set-back thermostats. Some of these set-back thermostats are basically electromechanical in that they utilize, for example, one or two bimetallic sensing elements coupled to a clock movement or timer. Others are basically electronic or solid state in that essentially all the components are electronic. Yet others are a combination of electromechanical and electronic components.

One particular electronic component utilized in some prior art set-back thermostats is a programmable microprocessor which offers considerable flexibility in establishing a desired time-temperature schedule. However, in known prior art devices incorporating a programmable microprocessor, the programming procedure that the homeowner must follow, in order to establish the desired time-temperature schedule, is extremely complicated.

SUMMARY OF THE INVENTION

It is, therefore, a primary object of this invention to provide a generally new and improved electronic set-back thermostat including a programmable microprocessor which is simply and easily programmed by the homeowner to establish a desired time-temperature schedule.

A further object of this invention is to provide an improved programmable electronic set-back thermostat which is relatively inexpensive, simple to install, simple to program, and extremely accurate in controlling temperature.

These and other objects of this invention are achieved by providing a programmable electronic set-back thermostat including an eight-segment keyboard, a programmable microprocessor, and an annunciated display. The annunciated display, due to pre-programming of the microprocessor, shows information such as WEEKDAY, WEEKEND, MORN, DAY, EVE, NITE, AM and PM, in a chronological sequence, along with a base time and base temperature. The displays are then recalled and, if necessary, changed by the homeowner, by means of the keyboard, to establish a desired time-temperature schedule. Another feature of the thermostat includes a temperature sensing circuit and a cooperative anticipation circuit for enabling accurate control of the temperature of the heated or cooled space. Yet another feature includes circuit means for ensuring that the thermostat will operate as a conventional thermostat in the event that a time-temperature schedule is not programmed by the homeowner.

DESCRIPTION OF THE PREFERRED EMBODIMENT

Figure 1:
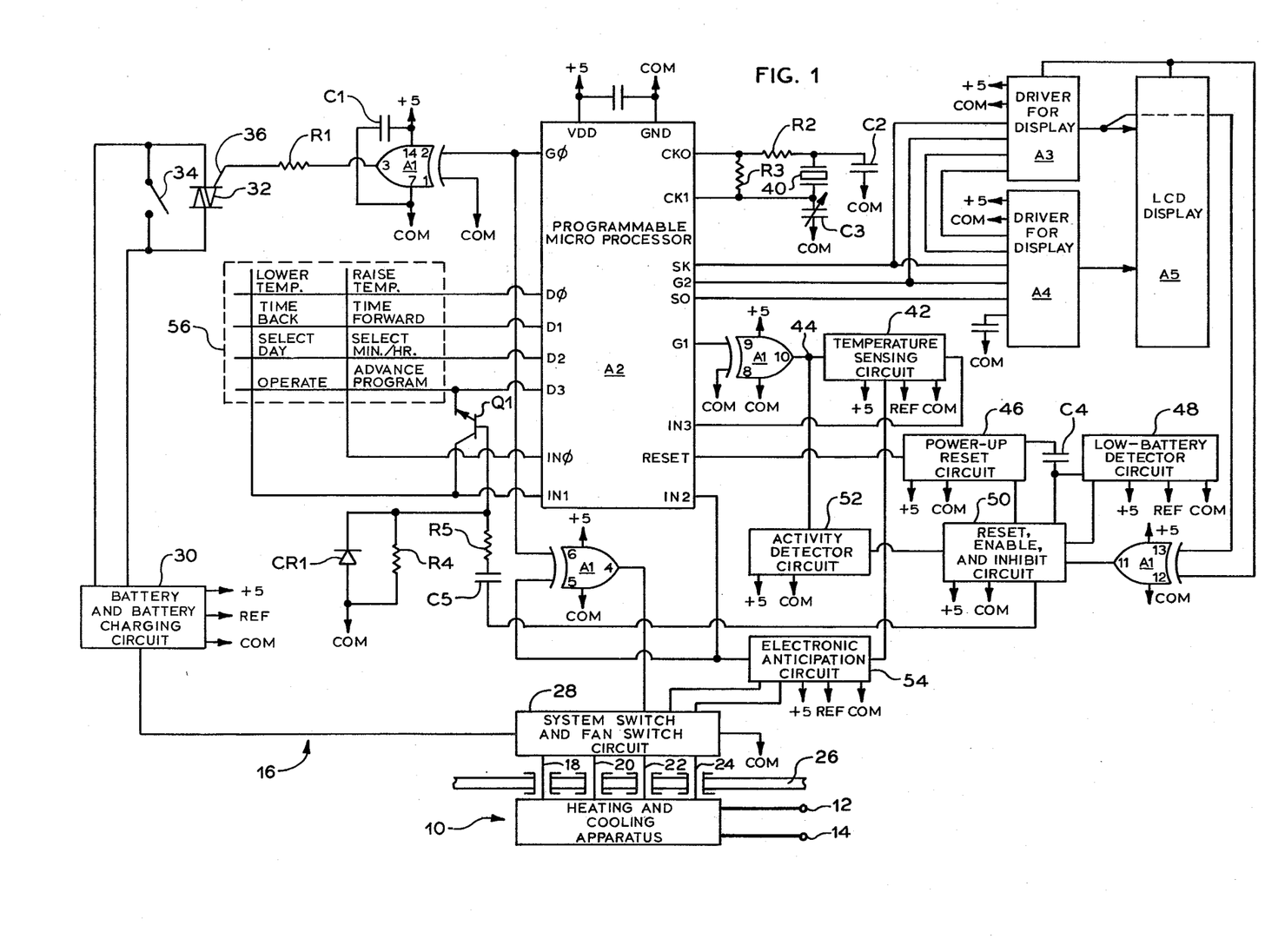
FIG. 1 is a schematic illustration, largely in block-diagram form, of a thermostat constructed in accordance with the present invention and shown connected to a heating and cooling apparatus.

While hereinafter described in considerably more detail, the circuitry shown in FIG. 1 will now be generally described as to its function. In FIG. 1, a space conditioning or heating and cooling apparatus, generally indicated at 10, is connected at terminals 12 and 14 to a conventional 120 volt alternating current power source. Apparatus 10 is connected to the thermostat, indicated generally at 16, by leads 18, 20, 22, and 24 which extend from apparatus 10 through a wall section 26 or similar partition to a system switch and fan switch circuit 28 of thermostat 16.

Connected to system switch and fan switch circuit 28 is a battery and battery charging circuit 30 which provides electrical power for the electronic components of thermostat 16. Connected to circuit 30 is a triac 32 and a switch 34. Triac 32, when conducting, enables the heating and cooling apparatus 10 to be energized. Switch 34, connected in parallel with triac 32, is a temperature responsive switch closes its contacts at a temperature of approximately 40° F. so as to provide freeze-protection to the dwelling.

The gate terminal 36 of triac 32 is connected through a resistor R1 to an output pin 3 of an exclusive OR gate A1. The supply pin 14 of gate A1 is connected to the 5 volt output of the battery and battery charging circuit 30, and the supply pin 7 is ground or common. A capacitor C1 is connected across supply pins 14 and 7 for noise suppression.

One of the input pins 1 of gate A1 is connected to common. Another input pin 2 of gate A1 is connected to an output pin G$\phi$ of a programmable microprocessor A2. When an enabling output signal from pin G$\phi$ is applied to gate A1, the output pin 3 of gate A1 goes high, enabling triac 32 to be gated on.

Microprocessor A2 is connected to the 5 volt output and common of the battery and battery charging circuit 30 at pins VDD and GND, respectively. A crystal 40, such as a quartz crystal, is connected to pins CK0 and CK1 of microprocessor A2 through a resistor R2. A resistor R3 is connected across pins CK0 and CK1. A capacitor C2 is connected from one side of crystal 40 to common, and a variable capacitor C3 is connected from the other side of crystal 40 to common. The circuitry of crystal 40, resistors R2 and R3, and capacitors C2 and C3, combines with the internal circuitry of microprocessor A2 to provide a crystal oscillator which establishes an accurate time base for operation of microprocessors A2.

A temperature sensing circuit 42 and another portion of exclusive OR gate A1 are series connected between an output pin G1 and an input pin IN3 of microprocessor A2. Temperature sensing circuit 42 samples ambient temperature and provides updated information regarding ambient temperature to the memory of microprocessor A2.

Connected between an input pin RESET of microprocessor A2 and a junction 44 of gate A1 and temperature sensing circuit 42 are a power-up reset circuit 46, a low-battery detector circuit 48, a capacitor C4, a reset, enable, and inhibit circuit 50, and an activity detector circuit 52, the basic function of this circuitry being to establish a starting point for enabling the homeowner to program a desired time-temperature schedule into microprocessor A2.

An electronic anticipation circuit 54 is interconnected to temperature sensing circuit 42, system switch and fan switch circuit 28, another portion of exclusive OR gate A1, and an input pin IN2 of microprocessor A2. The function of this interconnection is to modify the operation of temperature sensing circuit 42 so as to provide anticipation, and to inform microprocessor A2, via input pin IN2 thereof, whether the system is in the heating mode or cooling mode.

A pressure-sensitive matrix keyboard 56 is connected to output pins D$\phi$, D1, D2, and D3, and input pins IN$\phi$ and IN1 of microprocessor A2. Keyboard 56 is the means by which the homeowner enters information into microprocessor A2.

The collector-emitter circuit of a transistor Q1 is connected across pins D3 and IN1 of microprocessor A2 to ensure that thermostat 28 will provide a thermostat function even if a program is not entered on keyboard 56. The base of Q1 is connected through a parallel-connected resistor R4 and controlled rectifier CR1 to common, and through a series-connected resistor R5 and capacitor C5 to reset, enable, and inhibit circuit 50.

Various time and temperature signals are transmitted via output pins SK, G2, and SO of microprocessor A2 to drivers A3 and A4 which operate a liquid-crystal display A5. Another portion of exclusive OR gate A1 is connected to driver A3, display A5, and the reset, enable, and inhibit circuit 50.

Figure 2:
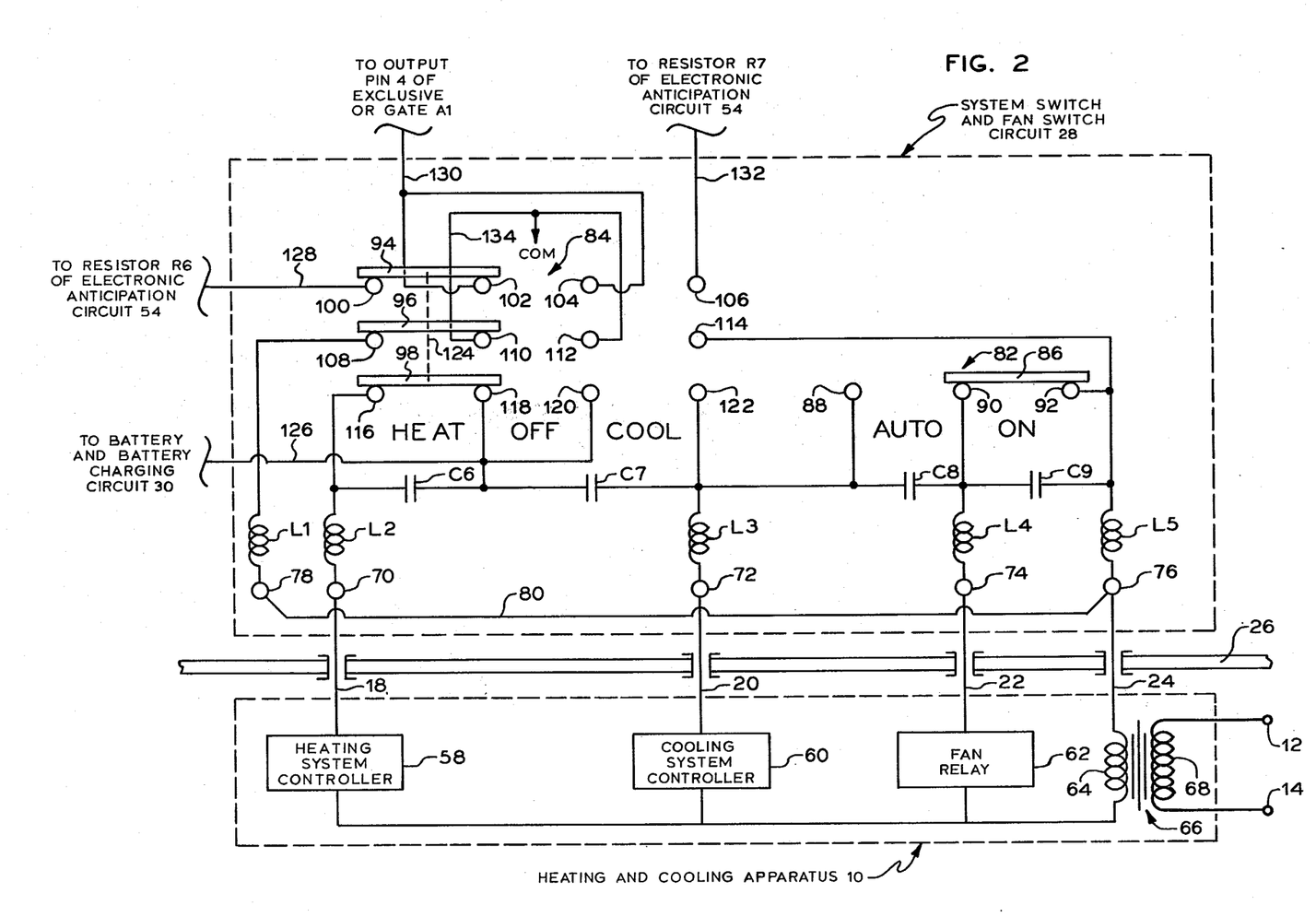
FIG. 2 is a detailed schematic of the heating and cooling apparatus and of the system switch and fan switch circuit of FIG. 1.

Referring now to FIG. 2, the heating and cooling apparatus 10 includes a heating system controller 58 such as a gas valve, a cooling system controller 60 such as a contactor, and a fan relay 62. Power for operating controllers 58 and 60 and relay 62 is supplied by the secondary coil 64 of a voltage step-down transformer 66. The primary coil 68 of transformer 66 is connected to terminals 12 and 14 of the conventional 120 volt alternating current power source. Heating and cooling apparatus 10 is an entirely conventional space conditioning apparatus, and no modification thereof is required to enable it to be controlled by the thermostat 16 of this invention.

The heating and cooling apparatus 10 is connected by leads 18, 20, 22, and 24 to terminals 70, 72, 74, and 76, respectively, of system switch and fan switch circuit 28. Circuit 28 also includes a terminal 78 and a lead 80 connected between terminals 78 and 76. If a separate transformer is used to energize heating system controller 58, heating system controller 58 is disconnected at one end from secondary winding 64, lead 80 is removed, and the added transformer is connected to terminal 78 and heating system controller 58, resulting in five wires being connected between apparatus 10 and circuit 28 instead of four.

System switch and fan switch circuit 28 includes a two-position fan selector switch 82 and a three-position, three-pole, system selector switch 84. Fan switch 82 is a conventional fan switch comprising a shorting bar 86 and contacts 88, 90, and 92. In the "ON" position, shorting bar 86 connects contacts 90 and 92. In such a position, fan relay 62 is directly energized by secondary winding 64 of transformer 66 so that the fan (not shown) runs continuously. In the "AUTO" position, wherein shorting bar 86 connects contacts 88 and 90, the fan relay 62 is energized only on a demand for cooling when in the cooling mode. With the fan switch 82 in the "AUTO" position and when the system is in the heating mode, the fan is controlled by a temperature responsive switch (not shown) on the furnace.

System selector switch 84 comprises three shorting bars 94, 96, and 98, and a plurality of contacts 100, 102, 104, 106, 108, 110, 112, 114, 116, 118, 120, and 122. Shorting bars 94, 96, and 98 are mechanically connected together at 124. In the "HEAT" position, shorting bar 94 connects contacts 100 and 102, bar 96 connects contacts 108 and 110, and bar 98 connects contacts 116 and 118. In the "OFF" position, shorting bar 94 connects contacts 102 and 104, bar 96 connects contacts 110 and 112, and bar 98 connects contacts 118 and 120. In the "COOL" position, shorting bar 94 connects terminals 104 and 106, bar 96 connects contacts 112 and 114, and bar 98 connects contacts 120 and 122.

A plurality of choke coils is connected in circuit 28 to inhibit transient spikes which may adversely affect operation of thermostat 16. Specifically, a choke L1 is connected between terminal 78 and contact 108, a choke L2 is connected between terminal 70 and contact 116, a choke L3 is connected between terminal 72 and contact 122, a choke L4 is connected between terminal 74 and contact 90, a choke L5 is connected between terminal 76 and contacts 92 and 114. Also, a plurality of capacitors is utilized in circuit 28 to filter any transients. Specifically, a capacitor C6 is connected between contacts 116 and 118, a capacitor C7 is connected between contacts 118 and 122, a capacitor C8 is connected between contacts 88 and 90, and a capacitor C9 is connected between contacts 90 and 92.

As illustrated in FIG. 2, contacts 118 and 120 are connected to the battery and battery charging circuit 30 by a lead 126, contact 100 is connected to a resistor R6 of the electronic anticipation circuit 54 by a lead 128, contacts 102 and 104 are connected to an output pin 4 of exclusive OR gate A1 by a lead 130, and contact 106 is connected to a resistor R7 of the electronic anticipation circuit 54 by a lead 132. Contacts 110 and 112 are connected together by a lead 134 to common. The significance of these connections will hereinafter be described.

Figure 3:
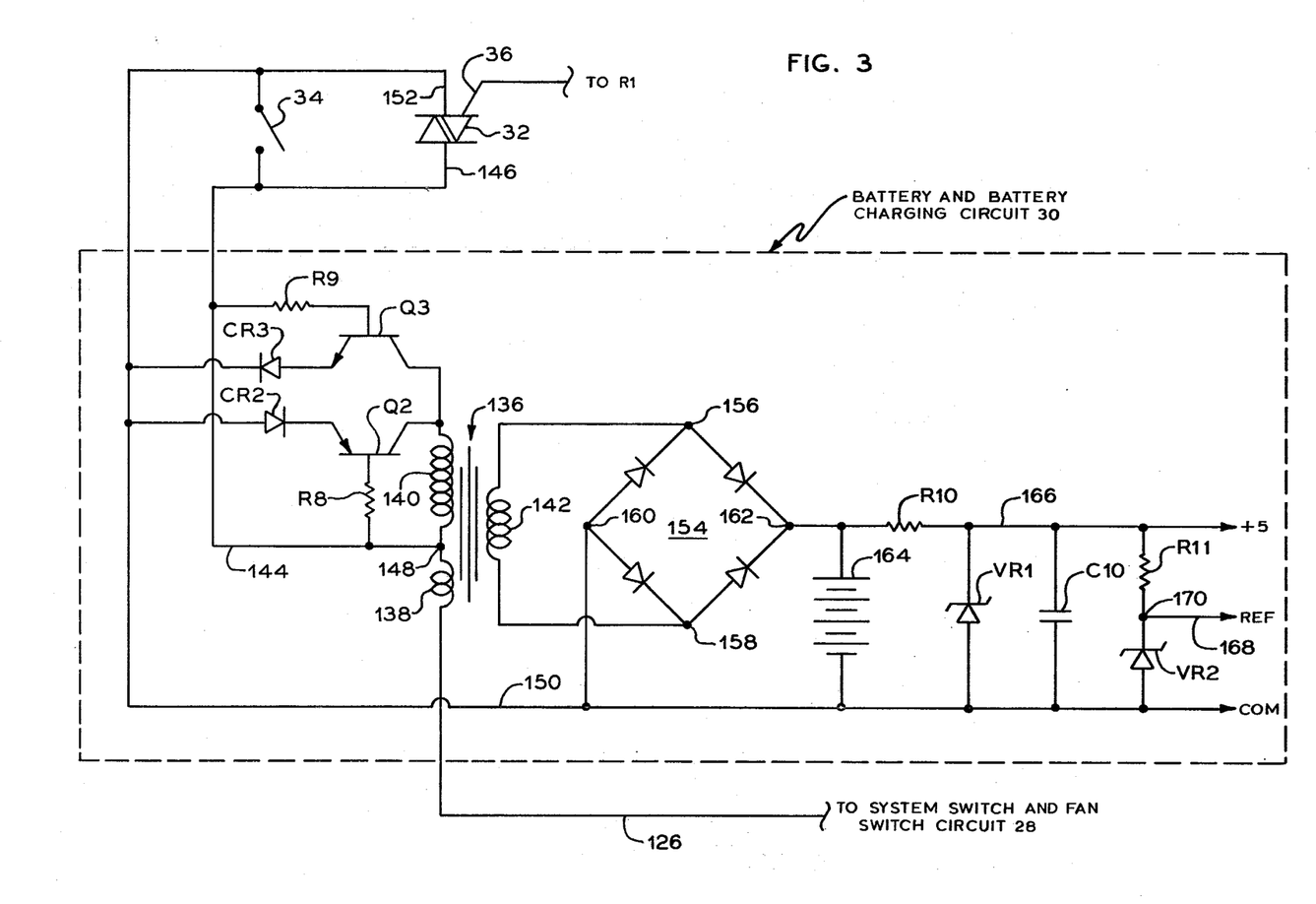
FIG. 3 is a detailed schematic of the battery and battery charging circuit of FIG. 1.

Referring now to FIG. 3, a transformer 136 comprises two series-connected primary windings 138 and 140, and a secondary winding 142. One end of primary winding 138 is connected to lead 126 which connects the battery and battery charging circuit 30 to system switch and fan switch circuit 28. A lead 144 connects a main terminal 146 of triac 32 to a junction 148 between primary windings 138 and 140. Another lead 150, designated as common, is connected to the other main terminal 152 of triac 32.

The anode of a controlled rectifier CR2 is connected to lead 150, and the cathode thereof is connected to the emitter of a transistor Q2. The base of transistor Q2 is connected through a bias resistor R8 and lead 144 to junction 148. The collector of transistor Q2 is connected to the end of primary winding 140 opposite junction 148. The cathode of a controlled rectifier CR3 is connected to lead 150 and the anode thereof is connected to the emitter of a transistor Q3. The base of transistor Q3 is connected through a resistor R9 and lead 144 to junction 148. The collector of transistor Q3 is connected to the end of primary winding 140 opposite junction 148.

A full wave rectifier 154 is connected at junctions 156 and 158 to secondary winding 142. Rectifier 154 is further connected at a junction 160 to common lead 150, and at a junction 162 to one side of a rechargeable storage battery 164, the other side of battery 164 being connected to common lead 150. Rectifier 154 is further connected at junction 162, through a dropping resistor R10, to a lead 166 designated as the +5 volt lead. A voltage regulator VR1 is connected across leads 166 and 150 to maintain 5 volts therebetween. A capacitor C10 is connected across leads 166 and 150 for noise suppression. Connected in series across leads 166 and 150 are a resistor R11 and a voltage regulator VR2. A lead 168, designated as a reference lead, is connected to a junction 170 between resistor R11 and regulator VR2.

As will now be described, the circuitry of FIGS. 2 and 3 cooperate to provide the required +5 volt and reference voltage outputs of battery and battery charging circuit 30, and to enable desired operation of heating and cooling apparatus 10 upon demand of triac 32.

With system selector switch 84 in the "HEAT" position and triac 32 in a non-conducting mode, the circuitry is as follows: from one side of secondary winding 64 of transformer 66, through heating system controller 58, lead 18, terminal 70, choke L2, contact 116, shorting bar 98, contact 118, lead 126, primary winding 138 of transformer 136, junction 148, lead 144, resistor R9, the base-emitter circuit of transistor Q3, rectifier CR3, common lead 150, lead 134, contact 110, shorting bar 96, contact 108, choke L1, terminal 78, lead 80, terminal 76, and lead 24 to the other side of secondary winding 64. Transistor Q3 is biased on so that current subsequently flows from lead 126, through both primary windings 138 and 140, the collector-emitter circuit of transistor Q3, and rectifier CR3 to common lead 150.

The impedance of primary winding 138 is quite low but the impedance of primary winding 140 is quite high, considerably higher than that of the heating system controller 58. Most of the voltage output of secondary winding 64 of transformer 66 appears across primary winding 140. The high impedance of primary winding 140 limits the current flow through heating system controller 58 to a sufficiently low value so that controller 58 is not energized.

The turns ratio of primary winding 140 of transformer 136 to secondary winding 142 is such that the induced voltage in secondary winding 142 is lower than the voltage across primary winding 140 but sufficiently high to effect charging of battery 164. Thus, under these conditions, battery 164 is charged to 5 volts ensuring that lead 166 is at a +5 volt potential with respect to common lead 150.

When polarity of the voltage at secondary winding 64 to transformer 68 reverses, transistor Q2 is biased on through rectifier CR2 and biasing resistor R8 so that during the reverse cycle, current flows through the collector-emitter circuit of transistor Q2 and primary windings 140 and 138 of transformer 136. The polarity of the induced voltage across secondary winding 142 is reversed. However, since rectifier 154 is a full-wave rectifier, battery 164 continues to be charged and lead 166 remains at the +5 volt potential.

When triac 32 becomes conductive, the current flow between leads 126 and 150 is through primary winding 138, junction 148, lead 144, and triac 32. Thus, when triac 32 conducts, current flows only through the low impedance primary winding 138. The impedance of primary winding 138 is sufficiently low in comparison with the impedance of heating system controller 58 so that very little voltage from secondary winding 64 of transformer 66 is dropped across primary winding 138. Thus, primary winding 138 does not adversely affect operation of heating system controller 58 and controller 58 is therefore energized.

The turns ratio of primary winding 138 of transformer 136 to secondary winding 142 is such that the induced voltage in secondary winding 142 is higher than the voltage across primary winding 138, and sufficiently high to effect charging of battery 164 and maintaining lead 166 at a +5 volt potential. It is readily seen that when the polarity of the voltage at secondary winding 64 of transformer 66 reverses, battery 164 will again be charged and the +5 volt potential on lead 166 will be maintained.

Thus, under normal operation in the heating mode, the battery 164 is constantly being charged and lead 166 is maintained at a +5 volt potential, both when the triac 32 is conducting and not conducting. Also, lead 168, designed as reference, is maintained by rectifier VR2 at +2.5 volts with respect to common lead 150.

When the system selector switch 84 is in the "COOL" position, operation of the circuitry of FIGS. 2 and 3 is similar. For the sake of brevity, a detailed description of such operation is omitted.

Figures 4, 4A:
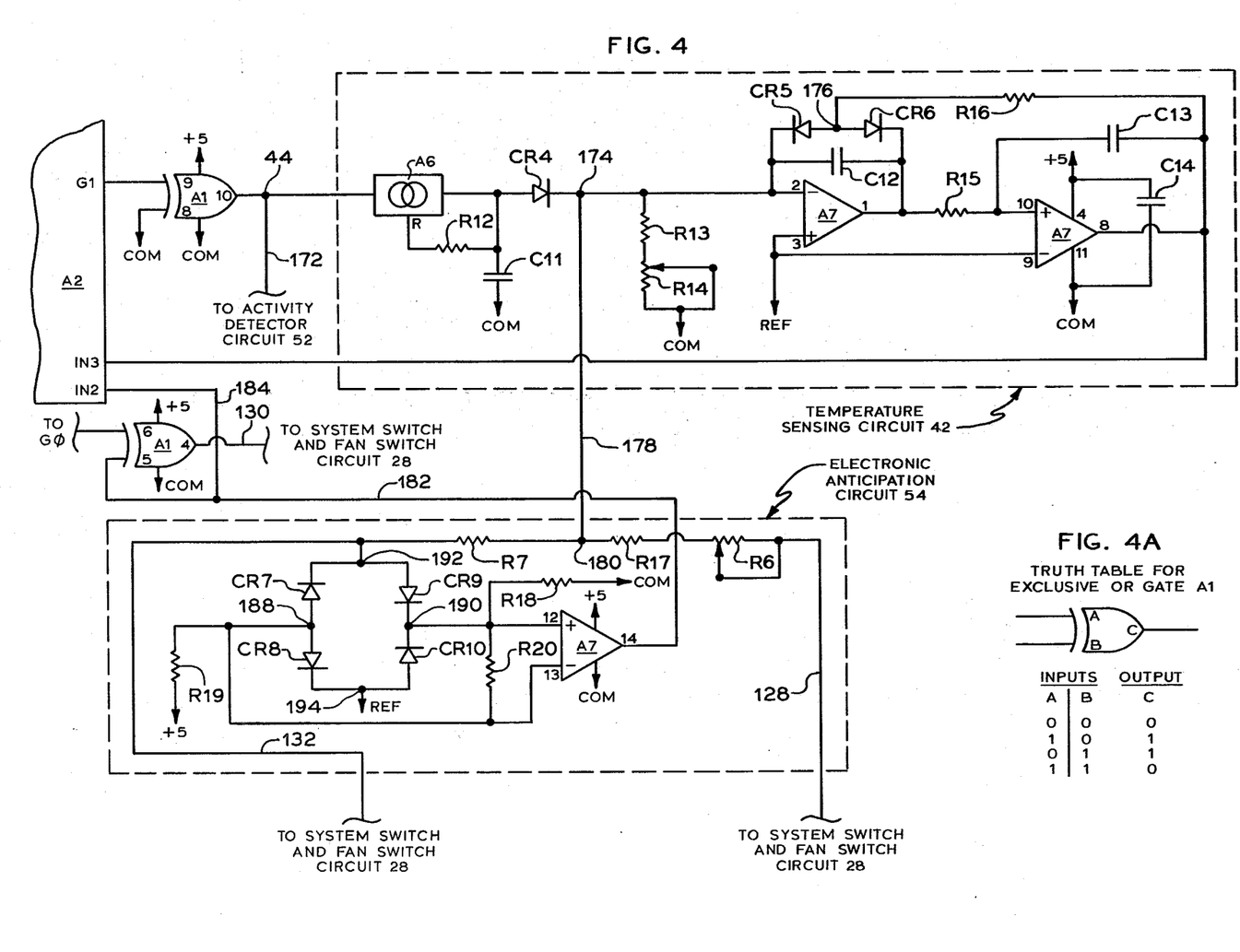
FIG. 4 is a detailed schematic of the temperature sensing circuit and the electronic anticipation circuit of FIG. 1.
FIG. 4A is the truth table for an exclusive OR gate.

Referring now to FIG. 4, the temperature sensing circuit 42 is connected between an output pin 10 of a portion of exclusive OR gate A1 and input pin IN3 of microprocessor A2. An input pin 9 of gate A1 is connected to output pin G1 of microprocessor A2, and an input pin 8 of gate A1 is connected to common. A lead 172, connected to the activity detector circuit 52, is connected to the junction 44 between output pin 10 of gate A1 and temperature sensing circuit 42.

Temperature sensing circuit 42 includes a temperature sensitive current regulator A6. Regulator A6 is an integrated-circuit linear device. Regulator A6 is connected at one end to junction 44 and at the other end through a controlled rectifier CR4 to a junction 174. A resistor R12 is connected between one end of regulator A6 and a pin R thereof to establish the desired slope of operation. A capacitor C11 is connected between one end of resistor R12 and common for noise suppression.

Connected between junction 174 and common are two series-connected resistors R13 and R14 which function to subtract current from junction 174. R14 is adjustable so as to provide a means for adjusting the amount of subtracted current.

Also connected to junction 174 is an inverting input pin 2 of an operational amplifier A7. A non-inverting input pin 3 of amplifier A7 is connected to reference. A capacitor C12 is connected between inverting pin 2 and output pin 1 of amplifier A7 for negative feedback. Also connected between inverting input pin 2 and output pin 1 of amplifier A7 are two controlled rectifiers CR5 and CR6. The cathode of rectifier CR5 is connected to inverting input pin 2 of amplifier A7, the cathode of rectifier CR6 is connected to output pin 1 of amplifier A7, and the anodes of rectifiers CR5 and CR6 are connected together at a junction 176.

Another portion of amplifier A7 has an inverting input pin 9 connected to the previously described non-inverting input pin 3 thereof, and a non-inverting input pin 10 connected through a resistor R15 to the previously described output pin 1 thereof. A capacitor C13 is connected between non-inverting input pin 10 and an output pin 8 of amplifier A7 for positive feedback. A capacitor C14 is connected, for noise suppression, between supply pins 4 and 11 of amplifier A7. The output pin 8 of amplifier A7 is connected to input pin IN3 of microprocessor A2 and through a resistor R16 to junction 176 between rectifiers CR5 and CR6.

Electronic anticipation circuit 54 is interconnected with temperature sensing circuit 42, system switch and fan switch circuit 28, exclusive OR gate A1, and microprocessor A2. Specifically, electronic anticipation circuit 54 is connected to temperature sensing circuit 42 by a lead 178 which connects junction 174 in circuit 42 to a junction 180 between resistor R7 and a resistor R17 in circuit 54. Electronic anticipation circuit 54 is connected to exclusive OR gate A1 by a lead 182 between an output pin 14 of amplifier A7 in circuit 54 and an input pin 5 of exclusive OR gate A1. Pin 14 of amplifier A7 is also connected to input pin IN2 of microprocessor A2 by lead 182 and a lead 184. As previously described, a lead 128 connects resistor R6 in electronic anticipation circuit 54 to system switch and fan switch circuit 28, a lead 132 connects resistor R7 in circuit 54 to circuit 28, and a lead 130 connects output pin 4 of exclusive OR gate A1 to system switch and fan switch circuit 28.

A non-inverting input pin 12 of amplifier A7 is connected through a resistor R18 to common. An inverting input pin 13 of amplifier A7 is connected through a resistor R19 to the 5 volt lead. A resistor R20 is connected across input pins 12 and 13 of amplifier A7. Resistors R19, R20, and R18 form a voltage divider between 5 volt lead and the common lead. Resistors R18 and R19 are 22 megohm resistors and resistor R20 is a 1 megohm resistor.

A diode bridge 186 comprising rectifiers CR7, CR8, CR9 and CR10 is connected at a junction 188 between the anodes of rectifiers CR7 and CR8 to resistor R19, at a junction 190 between the cathodes of rectifiers CR9 and CR10 to non-inverting input pin 12 of amplifier A7, at a junction 192 between the cathode of rectifier CR7 and the anode of rectifier CR9 to lead 132, and at a junction 194 between the cathode of rectifier CR8 and the anode of rectifier CR10 to the reference lead.

The functions of electronic anticipation circuit 54 are to provide proper anticipation to temperature sensing circuit 42 both in the heating mode and in the cooling mode, and to inform microprocessor A2 whether the system is in the heating mode or the cooling mode.

Referring to FIGS. 2 and 4, when the system selector switch 84 is moved to the "HEAT" position, output pin 4 of exclusive OR gate A1 is connected to junction 174 in temperature sensing circuit 42, the circuit being through lead 130, contact 102, shorting bar 94, contact 100, lead 128, resistors R6 and R17, and lead 178.

Upon a call for heat, a signal transmitted from output pin G$\phi$ of microprocessor A2 to input pin 6 of exclusive OR gate A1 is high or 1. As will be later described, junction 174 in temperature sensing circuit 42 is maintained at 2.5 volts. In the absence of current flow through resistor R7, junction 192 in bridge 186 is also at 2.5 volts.

Inverting input pin 13 of amplifier A7 is, due to the voltage divider of resistors R19, R20, and R18, at a potential slightly larger than 2.5 volts, but not sufficiently larger than the 2.5 volt potential at junctions 192 and 194 in bridge 186 to enable the rectifiers CR7 and CR8 to conduct. Under these conditions, the diodes in bridge 186 do not conduct, and inverting input pin 13 of amplifier A7 is more positive than the non-inverting input pin 12 thereof so that output pin 14 thereof goes low or 0. Since output pin 14 of amplifier A7 is connected to input pin 5 of exclusive OR gate A1, input pin 5 goes low. From the truth table of FIG. 4A, it is seen that with input pin 6 of exclusive OR gate A1 in the high state and input pin 5 thereof in the low state, output pin 4 thereof is high.

With output pin 4 of gate A1 in the high state, current flows from the 5 volt supply lead at gate A1, through lead 130, contact 102, shorting bar 94, contact 100, lead 128, resistors R6 and R17, and lead 178 to junction 174. As will be later described, this addition of current into junction 174 provides the desired anticipation function when there is a call for heat.

When there is no call for heat, the signal from output pin G$\phi$ of microprocessor A2 to input pin 6 of gate A1 is low or 0. The conditions at amplifier A7 are unchanged so that output pin 14 thereof, and thus input pin 5 of gate A1, are again low. From the truth table of FIG. 4A, it is seen that output pin 4 is therefore low. With output pin 4 low, current now flows from junction 174 through lead 178, resistors R17 and R6, lead 128, contact 100, shorting bar 94, contact 102, and lead 130 through the common lead at gate A1. As will be later described, this subtraction of current from junction 174 provides the desired anticipation function when there is no call for heat.

When the system selector switch 84 in FIG. 2 is moved to the "COOL" position, output pin 4 of exclusive OR gate A1 is connected to junction 192 in bridge 186, the circuit being through lead 130, contact 104, shorting bar 94, contact 106, and lead 132. Since junction 192 is connected in the above described manner to output pin 4 of gate A1, junction 192 will also be either at 5 volt or common.

Upon a call for cooling, input pin 6 of exclusive OR gate A1 goes high in response to a high signal from output pin G$\phi$ of microprocessor A2. Assuming output pin 4 of gate A1 goes low, junction 192 in bridge 186 also goes low. Under these conditions, rectifier CR7 conducts, causing junction 188 and thus inverting input pin 13 of amplifier A7 to be at approximately 0.6 volts. Also, rectifier CR10 conducts, causing approximately 1.9 volts, the reference voltage of 2.5 volts at junction 194 minus the forward voltage drop across rectifier CR10 of 0.6 volts, to be applied at junction 190 and thus at the non-inverting input pin 12 of amplifier A7. Under these conditions, the output pin 14 of amplifier A7 goes high, and thus input pin 5 of gate A1 goes high. The truth table of FIG. 4A verifies that the assumed low state of output pin 4 of gate A1 was correct.

With output pin 4 of exclusive OR gate A1 in the low state, current flows from junction 174 through lead 178, resistor R7, lead 132, contact 106, shorting bar 94, contact 104, and lead 130, through the common lead at gate A1. As will later be described, the subtraction of current from junction 174 provides the desired anticipation function when there is a call for cooling.

When there is no call for cooling, a low signal appears at output pin Gφ of microprocessor A2 so that input pin 6 of gate A1 is low. Assuming output pin 4 of gate A1 goes high, junction 192 in bridge 186 also goes high. Under these conditions, rectifier CR9 conducts, causing junction 190 and thus non-inverting input pin 12 of amplifier A7 to be approximately 4.4 volts, the supply voltage of 5 volts minus the forward voltage drop across rectifier CR9 of 0.6 volts. Also, rectifier CR8 conducts, causing junction 188 and thus inverting input pin 13 of amplifier A7 to be approximately 3.1 volts, the reference voltage of 2.5 volts at junction 194 plus the forward voltage drop across rectifier CR8 of 0.6 volts. Under these conditions, output pin 14 of amplifier A7 again goes high so that input pin 5 of exclusive OR gate A1 again goes high. The truth table of FIG. 4A verifies that the assumed high state of output pin 4 of gate A1 was correct.

With output pin 4 of exclusive OR gate A1 in the high state, current flows from the 5 volt supply lead at gate A1, through lead 130, contact 104, shorting bar 94, contact 106, lead 132, resistor R7, and lead 178 to junction 174. As will be later described, this addition of current into junction 174 provides the desired anticipation function when there is no call for cooling.

Input pin 5 of exclusive OR gate A1 is also connected to input pin IN2 of microprocessor A2. It is noted, from the above description, that input pin 5 of gate A1 is always low when thermostat 16 is in the heating mode and always high when thermostat 16 is in the cooling mode. This information, supplied to microprocessor A2 through its input pin IN2, enables microprocessor A2 to gate triac 32 into conduction both when there is a drop in temperature, as required when thermostat 16 is in the heating mode, and when there is a rise in temperature, as required when thermostat 16 is in the cooling mode.

Referring now to the temperature sensing circuit 42 in FIG. 4, the function of circuit 42 is to measure temperature and to provide a digital signal indicative of the measured temperature to microprocessor A2.

Junction 174 is maintained slightly above or slightly below 2.5 volts by a portion of amplifier A7 having input pins 2 and 3 and output pin 1. Specifically, a non-inverting input pin 3 of amplifier A7 is connected to the reference voltage of 2.5 volts. An inverting input pin 2 is connected to junction 174. The capacitor C12 is connected for negative feedback between output pin 1 and inverting input pin 2. This portion of amplifier A7 functions as an operational amplifier, tending to maintain inverting input pin 2, and thus junction 174, at 2.5 volts.

An inverting input pin 9 of another portion of amplifier A7 is connected to the reference voltage of 2.5 volts. A non-inverting input pin 10 thereof is connected through resistor R15 to the output pin 1. An output pin 8 thereof is connected to input pin IN3 of microprocessor A2, and capacitor C13 is connected between output pin 8 and non-inverting input pin 10 for positive feedback. The portion of amplifier A7 having pins 8, 9, and 10 functions as a comparator, providing a high output when the voltage at non-inverting input pin 10 is slightly more positive than the voltage at inverting input pin 9, and a low output when the voltage at pin 10 is slightly less positive than that at pin 9.

In operation, a repetitive signal is generated at output pin G1 of microprocessor A2. When the signal is high, an output pin 10 of exclusive OR gate A1 goes high, enabling current to flow from the 5 volt source through gate A1 and current regulator A6. Current subsequently also flows through resistors R13 and R14, tending to cause the voltage at inverting input pin 2 of amplifier A7 to become more positive than the voltage at non-inverting input pin 3. Capacitor C12 is also charged. Under these conditions, the voltage at output pin 1, and thus at non-inverting input pin 10, tends to decrease. When the voltage at non-inverting input pin 10 is sufficiently less positive than the voltage at inverting input pin 9, output pin 8 provides a low output.

When the signal generated at output pin G1 of microprocessor A2 goes low, capacitor C12 begins to discharge, and the voltage at inverting input pin 2 of amplifier A7 decreases until it is slightly less positive than non-inverting input pin 3. Under these conditions, the voltage at output pin 1, and thus at non-inverting input pin 10, increases until it becomes sufficiently more positive than inverting input pin 9 so that the output pin 8 provides a high output.

The digital signal at output pin 8 of amplifier A7 is transmitted to input pin IN3 of microprocessor A2, and the duration of the low signal at output pin 8 is indicative of the measured temperature. Specifically, the length of time required for non-inverting input pin 10 to return to a voltage sufficiently more positive than the voltage at inverting input pin 9 so as to effect a high signal at output pin 8, is dependent upon the charge on capacitor C12 which, in turn, is dependent upon the amount of current flow available to charge capacitor C12 which, in turn, is dependent upon the temperature sensed by regulator A6, the amount of current flow through resistors R13 and R14, and the amount of current flow into or away from junction 174 through lead 178.

Regarding current flow through resistors R13 and R14, resistor R14 is an adjustable resistor which enables accurate initial calibration of the device. Regarding current flow into or away from junction 174, as previously described, electronic anticipation circuit 54 is effective to cause such current flow into or away from junction 174. When current flows into junction 174, the duration of the low signal at input pin IN3 of microprocessor A2 increases, indicating a temperature higher than that sensed by current regulator A6. Similarly, when current flows away from junction 174, the duration of the low signal decreases, indicating a temperature lower than that sensed by current regulator A6.

Figures 5, 5A:
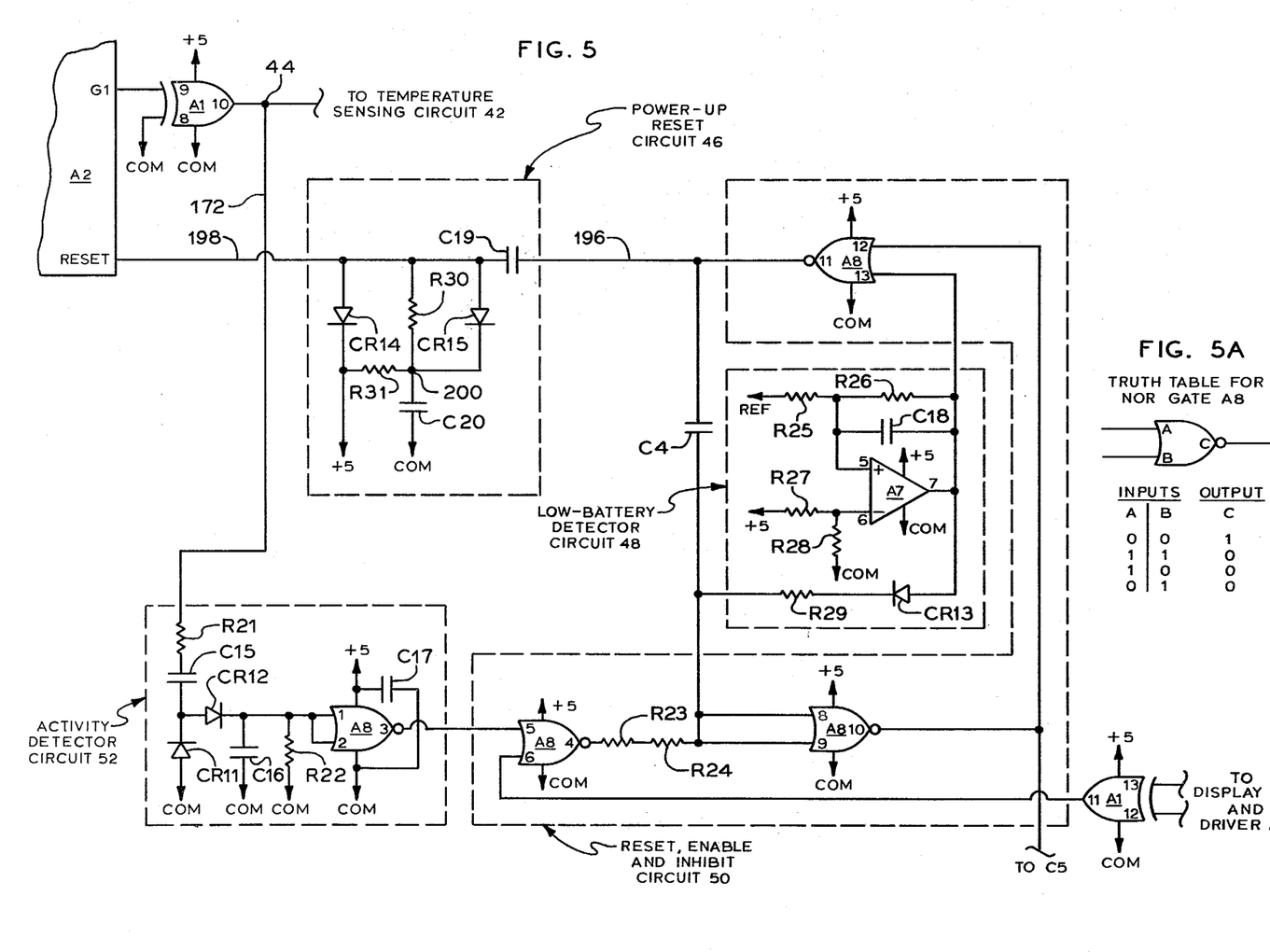
FIG. 5 is a detailed schematic of the power-up reset circuit, low-battery detector circuit, activity detector circuit, and the reset, enable, and inhibit circuit of FIG. 1.
FIG. 5A is the truth table for a NOR gate.

Referring now to FIG. 5, the activity detector circuit 52 is connected by lead 172 to junction 44. Circuit 52 includes a series-connected resistor R21, capacitor C15, and rectifier CR11. The anode of rectifier CR11 is connected to common and the cathode thereof is connected to the anode of a rectifier CR12. A capacitor C16 is connected from the cathode of rectifier CR12 to common. Also, a resistor R22 is connected from the cathode of rectifier CR12 to common. Input pins 1 and 2 of a portion of a NOR gate A8 are also connected to the cathode of rectifier CR12. A capacitor C17 is connected across the supply pins of gate A8 for noise suppression. An output pin 3 of NOR gate A8 is connected to an input pin 5 of another portion of NOR gate A8 in the reset, enable, and inhibit circuit 50.

In circuit 50, another input pin 6 of NOR gate A8 is connected to an output pin 11 of a portion of exclusive OR gate A1. An input pin 12 of gate A1 is connected to the back plane and back plane drive of driver A3 and display A5, respectively, of FIG. 1, and an input pin 13 of gate A1 is connected to a LO BATT segment of display A5, as will be later described. An output pin 4 of NOR gate A8 is connected through resistors R23 and R24 to input pins 8 and 9 of another portion of NOR gate A8. An output pin 10 of NOR gate A8 is connected to capacitor C5 of FIG. 1, for a reason to be later described, and to an input pin 12 of another portion of NOR gate A8. Another input pin 13 of NOR gate A8 is connected to an output pin 7 of a portion of amplifier A7 in the low-battery detector circuit 48.

In circuit 48, a non-inverting input pin 5 of amplifier A7 is connected through a resistor R25 to the reference voltage of 2.5 volts. A capacitor C18 and a resistor R26 are connected in parallel between non-inverting input pin 5 and output pin 7 of amplifier A7 for positive feedback. An inverting input pin 6 of amplifier A7 is connected through a resistor R27 to the 5 volt supply and through a resistor R28 to common. The anode of a rectifier CR13 is connected to output pin 7 of amplifier A7. The cathode of rectifier CR13 is connected through a resistor R29 to input pins 8 and 9 of NOR gate A8. Capacitor C4 is connected between input pins 8 and 9 of one portion of NOR gate A8 and output pin 11 of another portion thereof.

The output pin 11 of NOR gate A8 is connected through a lead 196, a capacitor C19 in the power-up reset circuit 46, and a lead 198 to the RESET pin of microprocessor A2. In circuit 46, the anode of a rectifier CR14 is connected to lead 198 and the cathode thereof is connected to the 5 volt supply. Another rectifier CR15 has its anode connected to lead 198 and its cathode connected to a junction 200. A resistor R30 is connected in parallel with rectifier CR15. A capacitor C20 is connected between junction 200 and common, and a resistor R31 is connected between junction 200 and the 5 volt supply.

In operation, capacitor C20 in power-up reset circuit 46 is charged by the 5 volt supply through resistor R31. When capacitor C20 is sufficiently charged, it results in a high on lead 198 through resistor R30. The change from low to high on the RESET pin of microprocessor A2 allows it to go into its thermometer program. Rectifier CR15 is effective to ensure that a high, sufficient to activate the reset function of microprocessor A2, will not be provided by means other than capacitor C20. Specifically, a high which might be initiated at the supply pins of NOR gate A8 can only result in lead 198 being approximately 0.6 volts higher than junction 220.

When microprocessor A2 is in the thermometer program, a digital signal appears at junction 44. This signal is applied to the temperature sensing circuit 42, enabling circuit 42 to measure ambient temperature. This signal is also applied to the activity detector circuit 52.

During the high portion of the signal at junction 44, capacitor C15 and C16 in circuit 52 begin to charge through resistor R21 and rectifier CR12. During the low portion of the signal, capacitor C15 discharges through resistor R21, exclusive OR gate A1, and rectifier CR11. Capacitor C16 has a discharge path through resistor R22, but the value of resistor R22 is sufficiently high so that capacitor C16 is gradually charged to provide a high on input pins 1 and 2 of NOR gate A8. It is noted that if the signal at junction 44 is not a proper digital signal, capacitor C15 would charge and prevent a high from appearing on input pins 1 and 2 of NOR gate A8. The truth table of FIG. 5A shows that a high on input pins 1 and 2 of NOR gate A8 results in a low on output pin 3 thereof. A low is thus also applied to input pin 5 of another portion of NOR gate A8 in the reset, enable, and inhibit circuit 50.

In the thermometer program, microprocessor A2 causes ambient temperature, as measured by the temperature sensing circuit 42, and LO BATT to be displayed in display A5. The LO BATT display results in inlet pins 12 and 13 of exclusive OR gate A1 to be out of phase with each other so that the output pin 11 thereof is high. Thus a high also appears at input pin 6 of NOR gate A8 in circuit 50. With a low on input pin 5 and a high on input pin 6, the output pin 4 of NOR gate A8 is low.

Assuming that the battery and battery charging circuit 30 is functioning properly, the inverting input pin 6 of amplifier A7 in low-battery detector circuit 48 is more positive than the non-inverting input pin 5 thereof. The output pin 7 of amplifier A7 is therefore low. A low on output pin 7 is applied to input pin 13 of NOR gate A8. Since there is a low on output pin 7, rectifier CR13 does not conduct, and input pins 8 and 9 of one portion of NOR gate A8 are at the same low as output pin 4 of another portion thereof. With a low on input pins 8 and 9 of NOR gate A8, the output pin 10 thereof is high.

A high on output pin 10 of NOR gate A8 is applied to the base-emitter circuit of transistor Q1 in FIG. 1, through capacitor C5 and resistor R5. When transistor Q1 turns on, the emitter-collector circuit thereof couples output pin D3 and input pin IN1 of microprocessor A2, causing microprocessor A2 to go into its thermostat program wherein it will control room temperature at a predetermined value if no additional programming is performed on keyboard 56.

When transistor Q1 is turned on and microprocessor A2 goes into its thermostat program, the LO BATT in display A5 no longer appears so that input pins 12 and 13 of exclusive OR gate A1 are in phase. Output pin 11 thereof is therefore low. This low also appears at input pin 6 of NOR gate A8. With input pins 5 and 6 low, output pin 4 of NOR gate A8 is therefore high. A high on input pins 8 and 9 of another portion of NOR gate A8 causes a low on output pin 10 thereof. A low on output pin 10 enables capacitor C5 in FIG. 1 to discharge through NOR gate A8, rectifier CR1, and resistor R5, causing transistor Q1 to turn off. With transistor Q1 off, microprocessor A2 remains in its thermostat program. A low on output pin 10 of one portion of NOR gate A8 is also applied to input pin 12 of another portion thereof. With input pins 12 and 13 of NOR gate A8 low, output pin 11 thereof is high. Because of rectifier CR15, this high can cause lead 198 to go as high as 5.6 volts, and the RESET pin of microprocessor A2 is subsequently biased at that level.

If the battery voltage is actually low, the output pin of amplifier A7 would be high, causing rectifier CR13 to conduct. Input pins 8 and 9 of NOR gate A8 would be high, causing output pin 10 thereof to be low. This low would prevent transistor Q1 from turning on. If output pin 10 of one portion of NOR gate A8 is low, input pin 12 of another portion thereof is also low. With a low on input pin 12 and a high on input pin 13, the output pin 11 of NOR gate A8 is low. This would cause lead 198 to go low and then high, as capacitor C19 is charged by capacitor 20, causing another reset. Since transistor Q1 is off, microprocessor A2 would remain in the thermometer program until the output of the battery and battery charging circuit 30 was sufficient to cause output pin 7 of amplifier A7 to go low.

The circuitry of FIG. 5 thus automatically changes the microprocessor A2 from its thermometer program, wherein thermostat 16 is capble only of measuring temperature, to its thermostat program, wherein thermostat 16 is capable of maintaining a predetermined room temperature. It is noted that the thermometer program of microprocessor A2 facilitates calibrating thermostat 16. Specifically, in calibration, an artificial high is introduced between resistors R23 and R24 of reset, enable and inhibit circuit 50. This high inhibits turning on Q1, thus keeping microprocessor A2 in the thermometer program. With microprocessor A2 in the thermometer program, resistor R14 in FIG. 4 can be adjusted to calibrate thermostat 16.

Figure 6:
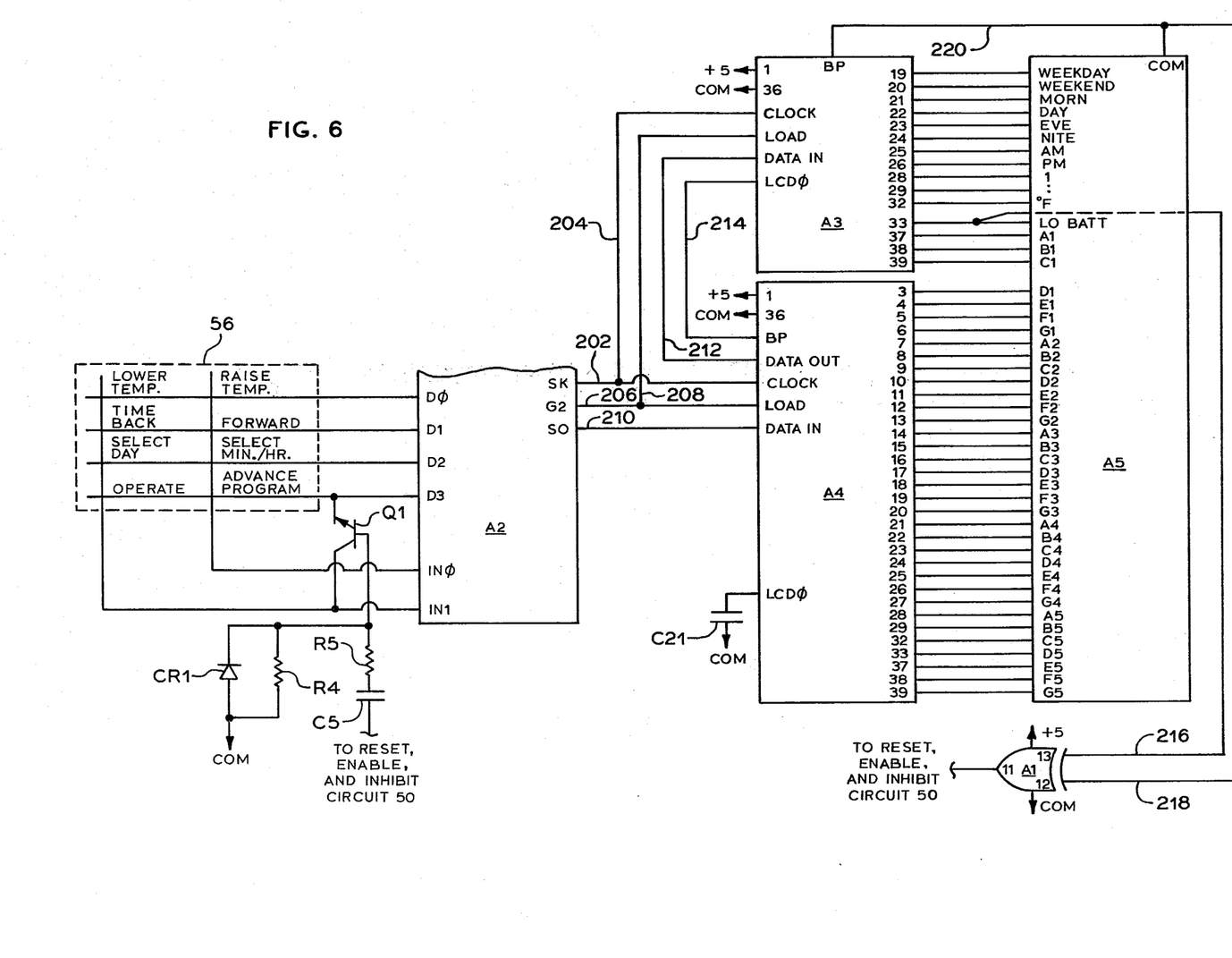
FIG. 6 is a schematic showing the interconnections of the keyboard, microprocessor, display drivers, and display of FIG. 1.

Referring now to FIG. 6, output pin SK of microprocessor A2 is connected by a lead 202 to an input pin CLOCK of driver A4 and by lead 202 and a lead 204 to an input pin CLOCK of driver A3. Output pin G2 of microprocessor A2 is connected by a lead 206 to an input pin LOAD of driver A4 and by lead 206 and a lead 208 to an input pin LOAD of driver A3. Output pins SK and G2 provide timing functions to drivers A3 and A4, output pin SK providing a serial clock signal and output pin G2 providing a gating signal.

Output pin SO of microprocessor A2 is connected by a lead 210 to an input pin DATA IN of driver A4. Output pin SO provides a serial output signal containing data regarding time and temperature. An output pin DATA OUT of driver A4 is connected by a lead 212 to an input pin DATA IN of driver A3 for handling data in excess of the capability of driver A4.

A clock pin LCD$\phi$ is connected through a capacitor C21 to common. Capacitor C21 determines the oscillating frequency of an oscillator for providing signals for the back plane drivers in drivers A3 and A4 and for the back plane in liquid-crystal display A5. A lead 214 between an output pin BP of driver A4 and an input pin LCD$\phi$ of driver A3 ensures that the oscillating frequencies of drivers A3 and A4 are the same. Power is provided to drivers A3 and A4 at input pins 1 and 36 thereof.

A plurality of output pins of drivers A3 and A4 is connected to a plurality of input pins of liquid-crystal display A5. Display A5 provides a plurality of seven-segment display positions plus displays of WEEKDAY, WEEKEND, MORN, DAY, EVE, NITE, AM, PM,1, :, °F, and LO BATT.

Previously described input pin 13 of exclusive OR gate A1 is connected by a lead 216 to the LO BATT segment of display A5, and the input pin 12 thereof is connected by a lead 218 to an output pin COM of display A5 and by lead 218 and a lead 220 to an output pin BP of driver A3.

Keyboard 56 is the means by which the homeowner programs microprocessor A2 to provide a desired time-temperature schedule of operation of thermostat 16. Such a schedule, in the preferred embodiment, can include two set-back and set-up periods in a 24-hour period, and diferent schedules for weekdays and weekends. A particularly advantageous feature of this invention is the simplicity of entering a program into microprocessor A2 for providing such a schedule.

Keyboard 56 is a pressure-sensitive matrix keyboard comprising eight matrices which, when individually and momentarily connected by the homeowner, selectively couple one of the output pins D$\phi$, D1, D2, and D3 to one of the input pins IN$\phi$ and IN1 of microprocessor A2. The matrices are identified as LOWER TEMP. which couples pins D$\phi$ and IN1, RAISE TEMP. which couples pins D$\phi$ and IN$\phi$, TIME BACK which couples pins D1 and IN1, TIME FORWARD which couples pins D1 and IN$\phi$, SELECT DAY which couples pins D2 and IN1, SELECT MIN./HR.which couples pins D2 and IN$\phi$, OPERATE which couples pins D3 and IN1, and ADVANCE PROGRAM which couples pins D3 and IN$\phi$.

Before programming, the fan switch 82 should be in the AUTO position, and the system switch 84 should be in the OFF position. This will prevent operation of the heating and cooling apparatus 10 during programming.

When power is initially applied to thermostat 16, the ambient temperature and LO BATT are displayed on display A5. After a few seconds, transistor Q1 turns on, causing the display A5 to show a predetermined temperature set-point, for example, 72, and an alternating display of time, starting at 12:00 AM, and ambient temperature in °F. As previously described, thermostat 16, when in this mode, is a functional device in that it can maintain room temperature at the predetermined temperature set-point. The method of programming microprocessor A2 to provide a desired time-temperature schedule will now be described.

Assume, for example, that a desired schedule of operation during the heating season for weekdays Monday through Friday is 70° F. at 6:15 a.m., 60° F. at 8:00 a.m., 70° F. at 4:00 p.m., and 60° F. at 10:30 p.m., and for weekend days Saturday and Sunday is 70° F. at 9:00 a.m. and 60° F. at 11:00 p.m.

1. Depress ADVANCE PROGRAM. Display A5 then recalls and shows MORN, AM, WEEKDAY, 6:00, and 72. Microprocessor A2 has been previously pre-programmed to display this initial information.

2. Depress TIME FORWARD until the display A5 shows 6:15. When so depressed, the displayed time changes or rolls in display A5 at a rate of fifteen minutes per second.

3. Depress LOWER TEMP. until display A5 shows 70, which is the desired temperature set-point starting at 6:15 a.m. When so depressed, the displayed temperature changes or rolls at a rate of two degrees fahrenheit per second.

4. Depress ADVANCE PROGRAM again. Display A5 then shows DAY, AM, WEEKDAY, 10:00, and 72. Again, microprocessor A2 has been pre-programmed to display this information.

5. Depress TIME BACK until the display A5 shows 8:00.

6. Depress LOWER TEMP. until the display A5 shows 60, which is the desired temperature set-point starting at 8:00 a.m.

7. Depress ADVANCE PROGRAM again. Display A5 then shows EVE, PM, WEEKDAY, 6:00, and 72. Again, microprocessor A2 has been pre-programmed to display this information.

8. Depress TIME BACK until the display A5 shows 4:00.

9. Depress LOWER TEMP. until the display A5 shows 70, which is the desired temperature set point starting at 4:00 p.m.

10. Depress ADVANCE PROGRAM again. Display A5 then shows NITE, PM, WEEKDAY, 10:00, and 72. Again, this information has previously been pre-programmed into microprocessor A2.

11. Depress TIME FORWARD until the display A5 shows 10:30.

12. Depress LOWER TEMP. until the display A5 shows 60, which is the desired temperature set-point starting at 10:30 p.m.

13. Depress ADVANCE PROGRAM again. Display A5 then shows MORN, AM, WEEKEND, 6:00, and 72. Again, microprocessor A2 has been pre-programmed to display this information.

Microprocessor A2 has also been pre-programmed to provide specific time ranges for programming morning, day, evening, and night temperature. Specifically, the morning time range is 4:00 a.m. to 7:45 a.m., the day time range is 8:00 a.m. to 11:45 a.m., the evening time range is 4:00 p.m. to 7:45 p.m., and the night time range is 8:00 p.m. to 11:45 p.m. To provide the desired temperature set-point of 60° F. through the entire morning time range of 4:00 a.m. to 7:45 a.m., depress LOWER TEMP. until the display shows 60.

14. To obtain the desired change in temperature set-point starting at 9:00 a.m. for weekends, ADVANCE PROGRAM must be depressed again, resulting in the next pre-programmed display of DAY, AM, WEEKEND, 10:00, and 72.

15. Depress TIME BACK until display A5 shows 9:00.

16. Depress LOWER TEMP. until display A5 shows 70, which is the desired temperature set-point starting at 9:00 a.m.

17. Depress ADVANCE PROGRAM again. Display A5 then shows a pre-programmed display of EVE, PM, WEEKEND, 6:00, and 72. Because 11:00 p.m. does not fall within the specific evening time range of 4:00 p.m. to 7:45 p.m., LOWER TEMP. must be depressed until the display A5 shows 70, which is the desired temperature set-point during the entire evening time range.

18. To obtain the desired change in temperature set-point starting at 11:00 p.m. for weekends, ADVANCE PROGRAM must be depressed again, resulting in the next pre-programmed display of NITE, PM, WEEKEND, 10:00, and 72.

19. Depress TIME FORWARD until display A5 shows 11:00.

20. Depress LOWER TEMP. until the display A5 shows 60, which is the desired temperature set-point starting at 11:00 p.m.

21. Depress SELECT MIN./HR. twice. Display A5 shows clock time hour of 12: and AM.

22. Depress TIME FORWARD to advance the hour until the correct hour and the correct designation of AM or PM is displayed, or depress TIME BACK to go backwards to obtain the correct hour and AM or PM. When so depressed, the displayed hour changes or rolls at a rate of two hours per second.

23. Depress SELECT MIN./HR. once. The display A5 shows clock time minutes.

24. Depress TIME FORWARD to advance the minutes until the correct time in minutes is displayed or depress TIME BACK to go backwards to obtain the correct minute. When so depressed, the displayed minutes change or roll at a rate of two minutes per second.

25. Depress SELECT DAY. Display A5 will show WEEKDAY and 1.

26. Depress TIME FORWARD or TIME BACK until the display A5 shows the day of the week corresponding to the day on which the program is entered on keyboard 56. For example, if the program is entered on Wednesday, depress TIME FORWARD or TIME BACK until the numeral 3 appears on display A5. The numeral 3 is based on consideration of Monday being day 1. The display A5 thus shows WEEKDAY and the numeral 3. As another example, if the program is entered on Sunday, depress TIME FORWARD or TIME BACK until the numeral 7 appears on display A5. The display A5 thus shows WEEKEND and the numeral 7.

27. Depress OPERATE. The display A5 will then show the correct temperature set point, and will show, alternately, the correct time and ambient temperature. Thermostat 16 is now programmed to provide, automatically, the desired time-temperature schedule of operation.

A new program can be entered for the cooling season, using the same basic steps described above.

The following circuit components have been found suitable for use in the thermostat 16 described herein.

| Component | Type |
|---|---|
| A1 | MM 74C86 |
| A2 | COP 420L |
| A3,A4 | HLCD 0438 |
| A5 | LC 425 |
| A6 | LM 334 |
| A7 | LM 324 |
| A8 | CD4001M |
| Q1 | SPS7599 |
| Q2 | MPS A55 |
| Q3 | MPS 6530 |
| Triac 32 | 2N6071-B |
| Keyboard 56 | 11 KS 121 (modified) |
| Crystal 40 | NE33 |
| CR1,4,5,6,11,12,13,14,15 | IN483A |
| CR2,3 | IN4004 |
| Bridges 154,186 | VM28 |
| VR1 | LM336BZ-5.0 |
| VR2 | LM336H |
| C1,6,7,8,9,10,14,15,16,17 | .1 Mfd. |
| C2,21 | 100 Pfd. |
| C3 | 15/60 Pfd. |
| C4,13,18 | .0047 Mfd. |
| C5 | 1.5 Mfd |
| C11 | 680 Pfd. |
| C12,19 | 10 Mfd. |
| C20 | 15 Mfd. |
| R1 | 510 Ohms |
| R2,15,29 | 10 k |
| R3,20 | 1 M |
| R4,18,19,22 | 22 M |
| R5,21,23,24,25,27,28,30,31 | 100 k |
| R6 | 1 M Potentiometer |
| R7 | 7.5 M |
| R8,9 | 47 K |
| R10 | 33 Ohms |
| R11 | 4.3 k |
| R12 | 126 Ohms |
| R13 | 4.7 k |
| R14 | 1 k potentiometer |
| R16 | 820 Ohms |
| R17 | 6.8 M |
| R26 | 5.6 M |

While the invention has been illustrated and described in detail in the drawings and foregoing description, it will be recognized that many changes and modifications will occur to those skilled in the art. It is therefore intended, by the appended claims, to cover any such changes and modifications as fall within the true spirt and scope of the invention.

We claim:

1. An improved method for programming a programmable electronic thermostat having pre-programmed time and temperature data stored therein including starting times and set-point temperatures for a plurality of chronologically arranged time periods, comprising the steps of:
- (a) displaying on display means the stored starting time and set-point temperature for a first of the plurality of chronologically arranged time periods;
- (b) changing forwardly or backwardly said displayed starting time, if different from a desired starting time, to establish said desired starting time for said first time period;
- (c) raising or lowering said displayed set-point temperature, if different from a desired set-point temperature, to establish said desired set-point temperature for said first time period;
- (d) displaying on said display means the stored starting times and set point temperatures of each subsequent time period of said plurality of chronologically arranged time periods and repeating steps (b) and (c) of this claim to establish a desired starting time and set-point temperature for each subsequent time period;
- (e) displaying clock time in minutes on said display means;
- (f) changing forwardly or backwardly said displayed clock time in minutes, if different from the correct clock time in minutes, to establish said correct clock time in minutes;
- (g) displaying clock time in hours on said display means;
- (h) changing forwardly or backwardly said displayed clock time in hours, if different from the correct clock time in hours, to establish said correct clock time in hours;
- (i) displaying a designation of the day of the week;
- (j) changing forwardly or backwardly said displayed day of the week, if different from the correct day of the week, to establish said correct day of the week; and
- (k) placing the thermostat in an operative mode.

2. The method claimed in claim 1 wherein said changing of said starting times, set-point temperatures, clock time in minutes, clock time in hours, and day of the week is accomplished by rolling the values thereof, said rolling occurring at a predetermined rated.

* * * * *